May 17, 1927.  
W. J. BOWMAN  
INNER TUBE  
Filed Aug. 18. 1924
1,628,642
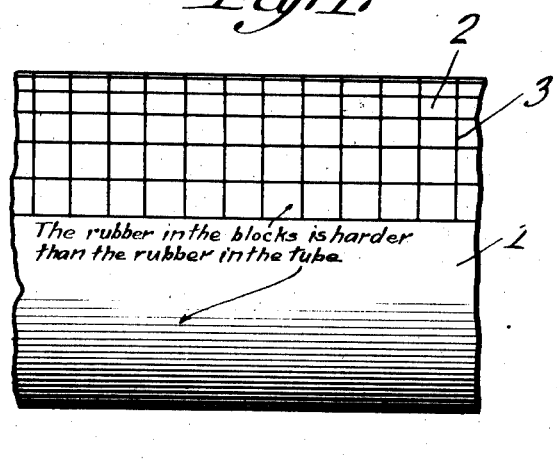
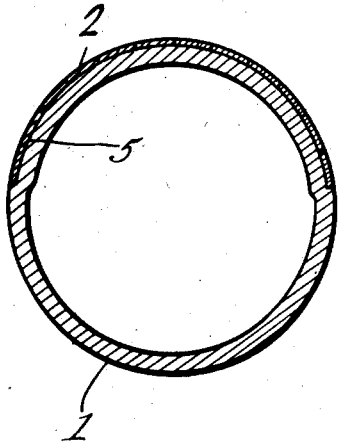
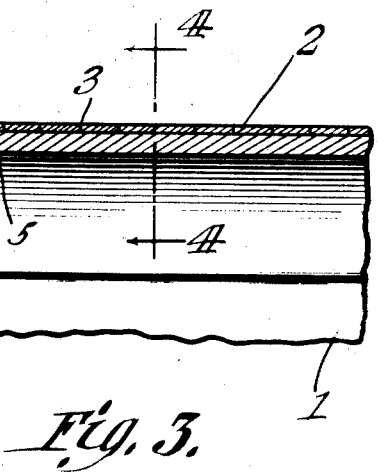
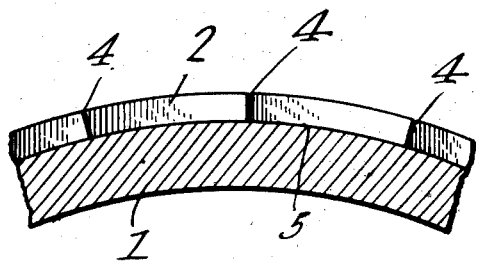
Inventor  
W. J. Bowman Patented May 17, 1927.

1,628,642

UNITED STATES PATENT OFFICE.

WILLIAM J. BOWMAN, OF SMITH CENTER, KANSAS.

INNER TUBE.

Application filed August 18, 1924. Serial No. 732,861.

The device forming the subject matter of this application is an inner tube for vehicle tires, and the invention aims to provide a simple but efficient means whereby the tube will be rendered practically puncture proof, without interfering appreciably with the resiliency of the tube.

In the accompanying drawings:—

Figure 1 shows in side elevation, a portion of the device constructed in accordance with the invention; Figure 2 is a transverse section; Figure 3 is a fragmental longitudinal or circumferential section; and Figure 4 is a section on the line 4—4 of Figure 3, on a greatly enlarged scale.

The drawing shows an inner tube 1 of rubber, for use in a vehicle tire, and a puncture-resisting armor for the tube, the armor comprising a plurality of rubber blocks 2, the rubber of which is harder than the constituent rubber of the tube 1, and hard enough to resist puncture. Adhesive material 5 on the inner surfaces of all of the blocks 2 secures them to the outer surface of the tube 1, the blocks being located so closely together, as shown at 3, about their entire peripheries, that they present a practically continuous anti-puncturing surface. Every one of the blocks 2 is free about its entire periphery, the peripheral surfaces of each of the blocks being disposed at right angles to the outer surface of the tube 1, throughout the entire periphery of each block. The blocks 2 are spaced far enough apart, as indicated at 4, about the periphery of every one of them, so that, when secured to the tube 1 as aforesaid, each block may move with the tube, and radially of the tube, without engaging an adjoining block in overlapped relation thereto.

What is claimed is:—

In a device of the class described, an inner tube of rubber, for use in a vehicle tire, and a puncture-resisting armor for the tube, the armor comprising a plurality of rubber blocks, the rubber of which is harder than the constituent rubber of the tube, and hard enough to resist puncture, and adhesive material on the inner surfaces of all of the blocks and securing them to the outer surface of the tube, the blocks being located so closely together, about their entire peripheries, that they present a practically continuous anti-puncturing surface; every one of the blocks being free about its entire periphery, the peripheral surfaces of each of the blocks being disposed at right angles to the outer surface of the tube, throughout the entire periphery of each block, and the blocks being spaced far enough apart, about the periphery of every one of them, so that, when secured to the tube as aforesaid, each block may move with the tube, and radially of the tube, without engaging an adjoining block in overlapped relation thereto.

In testimony that I claim the foregoing as my own, I have hereto affixed my signature.

WILLIAM J. BOWMAN.